April 5, 1938.  L. DE MONTGRAND  2,113,515
COUPLING APPARATUS
Filed Feb. 18, 1937
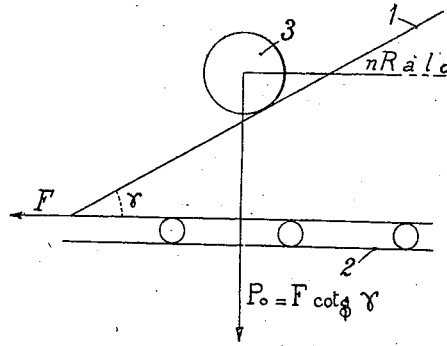
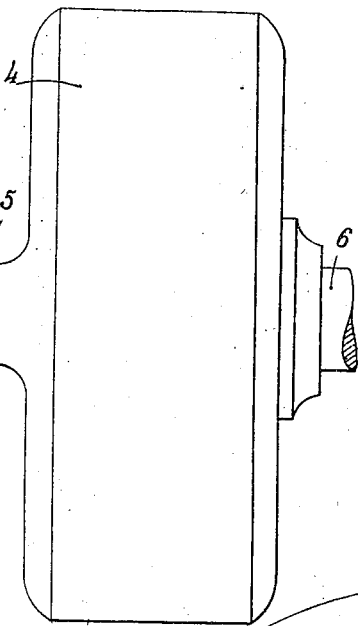
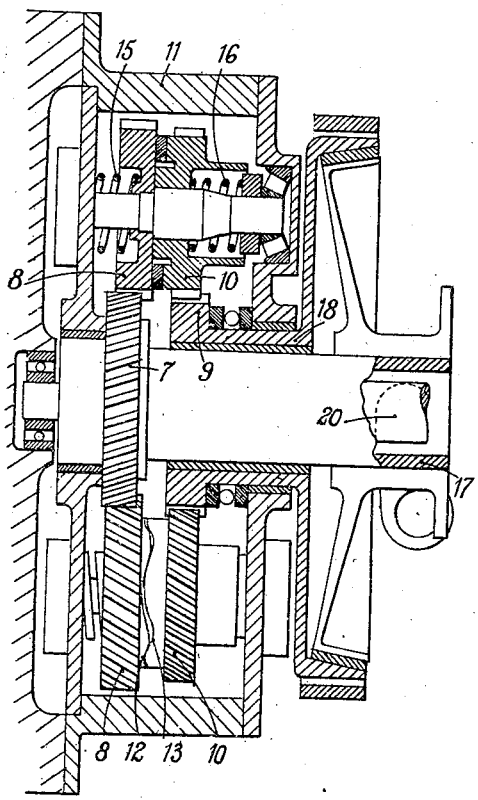
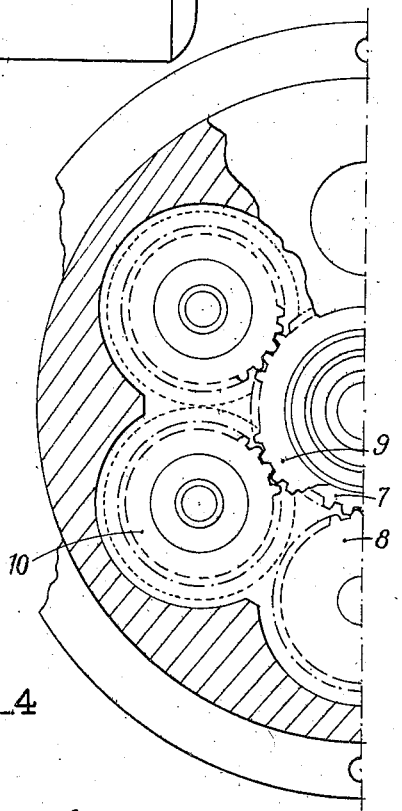
L. de Montgrand
Inventor
By Glascock Downing & Seebold
Attys Patented Apr. 5, 1938

2,113,515

UNITED STATES PATENT OFFICE 2,113,515

COUPLING APPARATUS

Léon de Montgrand, Marseille, France

Application February 18, 1937, Serial No. 126,459
In France February 27, 1936

1 Claim. (Cl. 74—259)

The present invention has for its object to provide coupling apparatus which can be applied to all transmission devices, and is in all cases adapted for the automatic balancing of the power torque and the load torque, or apparatus of such nature that the torque which it transmits will automatically increase or diminish as the load couple increases or diminishes.

The invention is based upon the following formula: In order that such an apparatus shall automatically balance the work of the power torque and the work of the load torque, it will suffice, theoretically, that when the driven shaft is supposed to be held fast, the organic work of the apparatus shall counterbalance the driving work.

In the drawing:

Fig. 1 is a diagrammatic showing of the formula.

Fig. 2 is a side elevation of the mechanism.

Fig. 3 is a cross-section of an embodiment of the invention.

Fig. 4 is a partial cross-section of Fig. 3 showing the gearing arrangement.

The formula is set forth below with reference to Fig. 1. An inclined part 1 having infinite length and an inclination $\gamma$, which is movable without friction upon a base plane 2 and parallel to itself, is subjected to a driving force F. At any point on the inclined part is located a movable part 3 which is coupled to the load, which latter is situated at an infinite distance. If R is the normal value of the load on direct drive, and if there is applied to the movable part 3 a force $F \cot \gamma = Po$, perpendicular to the base plane 2, the following equation is always obtained, for any value $nR$ of the load:

$F \times 1 = nR \times 1/n$, in which 1 is the distance covered.

It is demonstrated that the organic work of the apparatus supplies to the driven shaft, to the detriment of its speed, and by reaction, the complement of this torque corresponding to the complement of load.

It should be specified that if we call "organic power" the force Po, i. e., the resistance which should be set up in the apparatus in order that will conform to the aforesaid formula, the invention consists solely in the means for obtaining this organic power, and that any mechanical device which appears to resemble the same, can have nothing in common with my invention if it is not constructed in order to obtain the following effects:

1. The organic power should not be the result of a braking action.

2. It should depend upon the driving force. In the present case it is obtained by the lateral reaction due to the tangential force upon the helical pinions, this being simply completed by reaction springs which are also used for the adjustment.

3. As the infinite incline is replaced by a succession of inclines, and hence of cams, the general arrangement and the inclination of the teeth should be such as to prevent that on the descent, there shall be any restitution of the lateral force (reaction and spring) used in the rising movement.

With this in view, the present invention is carried into effect by the use of a rotary driven mechanism, whose main body, which is usually stationary, is in this case adapted for rotation and is connected with the engine by a shaft 5, whilst its central shaft 6 is secured to a driven shaft 6 by which it is extended, or inversely, (Fig. 2).

By way of example, a mechanical embodiment of the invention is given as follows (Figs. 3 and 4).

Two epicycloidal and helical gear sets 7—8 and 9—10, having common axes, are juxtaposed. These sets have slightly different gear ratios. The two sun-wheels 7—9 are fixed to the central shaft, which in this case is the driven shaft. Around the said shaft are mounted the shafts of the planetary pinions 8—10, which are symmetrically spaced apart and are rotated by the driving shaft through the medium of the main body 11 of the apparatus, which carries the bearings of said shafts. In each pair, the two planetary pinions turn loosely on their common shaft and have also a lateral motion. If the driven shaft is stationary or simply slowed up, the small planetary pinion 10 will rotate at a greater speed than the large planetary pinion of the same pair.

The basic formula is obtained in the following manner.

On the adjacent faces of the two planetary pinions of each pair (Fig. 4) are mounted two respective cams 12—13 of like form, which are concentric with the axis. The said cams fit into each other. To obtain a difference of speed of the two planetary pinions, the two cams must be separated, and thus the cams can be moved apart, and can then be brought together by reaction springs 15—16, and so on. If one of the cams were laterally fixed, it would represent the base plane 2, and the other cam, the movable part 3; the principle will remain the same if both cams are laterally movable. The combination consisting of the cams of a pair forms part of the infinite incline. The two planetary pinions are given a pitch, in one direction, such that their lateral reactions will be convergent and will be added together, thus providing the organic power Po, to which is added the effect of the reaction springs. The succession of the rising movements affording the infinite incline, is obtained by the proper angular spacing between the pairs.

The restitution is avoided in the following manner. On the one hand, the lateral reaction no longer takes place during the period of descent, for at this time the tangential force which causes the same is entirely brought upon a pair which is engaged in the rising period. On the othr hand, the restitution due to the springs is directed by an incidence of the teeth which is such that its effect is annulled.

The operation is as follows:

By reason of the resistance of the load to be overcome, the planetary pinions which are driven by the engine tend to rotate about the sun-wheels, and hence to cause successive separations of each pair, and thus to effect the rising movement of the inclined parts.

If the driving torque and the load torque are equal, this will produce, upon a pair of planetary pinions during the rising movement, an equilibrium between the tangential force of the engine and the organic power, and thus no rising movement will take place. The whole aggregate will form a unit, and this represents the direct drive:

$$F \times 1 = R \times 1$$

If the load torque increases, the planetary pinions will turn on their axes and also about the sun-wheels, and the device will rise upon the inclined parts. The above-mentioned static equilibrium is now replaced by the mechanical work due to the tangential force and to the organic power. This will effect a speed-reduction:

$$F \times 1 = nR \times 1/n$$

The object of the apparatus is thus realized, namely that of always obtaining equilibrium between the torques or mechanical work, which represent the drive and the load.

A slight modification of the said device provides for two secondary functions. If instead of being secured to the driven shaft, the two sun-wheels are respectively secured to two concentric shafts 17—18 which are slidable on each other, one shaft carrying a female clutch part and the other a male clutch part, these will be placed together by a clutch coupling whose reactions upon the sun-wheels will in this case provide the necessary pressure. The uncoupling effect will annul the reactions, as the sun-wheels are no longer connected together. In the embodiment shown in the drawing (Fig. 3), the shaft 18 is secured to the sun-wheel 9 and is provided in the interior with a bronze ring adapted to receive a shaft 17 which is hollow and contains a fluted shaft 20.

If the female part, when it is uncoupled, is held fast by a brake, the apparatus serves for the reversed drive, and it provides for a back motion, having a speed which is reduced according to the ratio of the two gear sets.

The said apparatus thus has three functions:

(1) The principal function being the automatic balancing of the torques or mechanical work, representing the power and the load.

(2) Optionally, if this should be necessary for a given machine to be equipped, two secondary functions, i. e., the coupling and uncoupling action, and the reversal of the movement.

The apparatus is applicable to all classes of transmission, and for instance for motor vehicles, airplanes, machine-tools, various machines, and the like, and with a special or variable adjustment, it will serve as a speed-reducing device or as a brake for the testing bench.

It is evident that the embodiment herein described is not of a limitative nature, and that the present invention will comprise all devices which are based upon the same principle, or devices which afford, by any means, organic power in conformity with the above-mentioned theorem.

I claim:

A power transmitting gearing comprising, two helically toothed sun-wheels carried by two coaxial driven shafts and having slightly different diameters, means for coupling said coaxial shafts, a driving rotary casing having the same axis as said driven shafts, planetary shafts parallel to said coaxial shafts and carried by said casing, two helically toothed planetary wheels loosely rotatable on each planetary shaft and meshing respectively with the said sun wheels, intermeshing annular cams on the adjacent faces of said planetary wheels and springs for pressing said planetary wheels one against the other.

L. DE MONTGRAND.